United States Patent Office 3,527,828
Patented Sept. 8, 1970

3,527,828
OLEFIN PRODUCTION
Frank D. Mango, Oakland, Calif., assignor to Shell Oil
Company, New York, N.Y., a corporation of Delaware
No Drawing. Filed Dec. 15, 1967, Ser. No. 690,770
The portion of the term of the patent subsequent to
Jan. 28, 1986, has been disclaimed
Int. Cl. C07c 11/02, 11/12
U.S. Cl. 260—677                                    11 Claims

ABSTRACT OF THE DISCLOSURE

Hydrocarbon telomers, having a plurality of ethylenic linkages and more than $m+n$ carbon atoms, produced by contacting in a reaction zone olefinic reactants of $m$ carbon atoms and acyclic monoolefins of $n$ carbon atoms in the presence of a molybdenum- or rhenium-containing catalyst to at least a minimum olefin conversion, and separating from the resulting product mixture the products of $m+n$ or less carbon atoms for recycle to the reaction zone.

BACKGROUND OF THE INVENTION

Reactions of olefinic molecules in the presence of metal-containing catalysts to produce olefinic products of a higher number of carbon atoms are well known in the art. One type of such reactions is termed an "oligomerization" process wherein a number of olefinic molecules combine to form a product of higher carbon number but of reduced carbon-carbon unsaturation. For example, ethylene oligomerizes to form dimers, trimers, tetramers and the like containing a number of $C_2$ ethylene units, but only a single ethylenic carbon-carbon double bond.

A second type of olefin conversion process is illustrated by processes in which two olefinic molecules react to produce an equal number of other olefinic molecules. This type of process is frequently termed a "disproportionation" process and is illustrated by U.S. Pat. No. 3,261,879, issued July 19, 1966, to Banks, wherein two similar olefinic molecules react to produce one olefin of a higher carbon number and one olefin of a lower carbon number. For example, propylene disproportionates by the process of U.S. Pat. No. 3,261,879 to produce ethylene and butene.

A variation of this process is illustrated by the published Netherland patent application No. 6,702,703 of Phillips Petroleum Company in which one of the olefinic reactants undergoing disproportionation is an acrylic olefin and the other olefinic reactant is a cyclic olefin, so that a single polyene product contains a number of carbon atoms and a number of ethylenic linkages equal to the sum of those present in one molecule of the cyclic reactant and one molecule of the acyclic reactant.

SUMMARY OF THE INVENTION

It has now been found that under the properly selected reaction conditions, a lower acyclic olefin and a cyclic olefin are reacted to form telomeric polyene products wherein the acyclic olefin has in effect served as the telogen and the cyclic olefin has served in effect as the taxogen. By way of illustration, ethylene and cyclopentene are reacted to form 1,6,11-dodecatriene and 1,6,11,16-heptadectatraene, which products are produced from reaction of one molecule of ethylene (the telogen) with 2 and 3 molecules, respectively, of cyclopentene (the taxogen). It has now been found that improved yields of novel telomeric products are produced by the process which comprises (a) contacting an acyclic olefin reactant of $n$ carbon atoms and a cyclic olefinic reactant of $m$ carbon atoms in a reaction zone at elevated temperature but at a relatively low reaction pressure until a desired level of olefin conversion has been obtained, (b) separating unconverted reactant and all product of $m+n$ or less carbon atoms from the resulting product mixture, thereby affording the desired telomeric product, and (c) recycling the product mixture components of $m+n$ or less carbon atoms to the reaction zone.

DESCRIPTION OF PREFERRED EMBODIMENTS

*The acyclic olefin.*—The acyclic olefin reactant is an acyclic monoolefin wherein each carbon atom which is a member of the carbon-carbon double bond has at least one hydrogen substituent, that is, each carbon atom which is a member of the ethylenic linkage is primary or secondary. One class of such acyclic olefins is represented by the formula $$R\text{—}CH\text{=}CH\text{—}R \qquad (I)$$

wherein R independently is hydrogen or alkyl of up to 4 carbon atoms with the total number of carbon atoms of the acyclic olefin reaction, which total is herein termed "$n$," being up to 8, preferably up to 4.

Illustrative of the acyclic olefin reactments are ethylene, propylene, 1-butene, 2-butene, 1-pentene, 3-hexene and 2-octene. Ethylene and propylene comprise a particularly preferred class of acyclic olefin reactants.

*The cyclic olefinic reactant.*—The cyclic olefinic reactant comprises a hydrocarbon of at least one ethylenic carbocyclic ring of at least 5 carbon atoms and each carbon atom of which has a hydrogen substituent. The cyclic olefinic reactant is monocyclic or polycyclic of up to 4 rings, preferably of up to 2 rings, and is a monoolefin reactant or is an olefinic reactant of up to 4 non-conjugated carbon-carbon double bonds, preferably of up to 2, which comprise the only unsaturation present within the molecule and each of which carbon-carbon double bonds is a portion of carbocyclic rings. One class of such cyclic olefinic reactants is represented by the formula

(II)

wherein A is a divalent hydrocarbon moiety of up to 3 carbocyclic rings, of from 3 to 10 carbon atoms and up to 3 ethylenic double bonds and is selected so that the carbon atoms depicted in the above Formula II are members of a carbocyclic ring of at least 5 carbon atoms. The total number of carbon atoms in the cyclic reactant, which total is herein termed "$m$," is therefore a whole number from 5 to 12 inclusive in the above-depicted preferred modification.

Illustrative monocyclic olefinic reactants include cyclopentene, cyclohexene, cycloheptene, cyclooctene, cyclodecene, 1,5-cyclooctadiene, 1,6-cyclodecadiene and 1,5,9-cyclododecatriene, whereas polycyclic olefinic reactants are illustrated by bicyclo(2.2.1)hepta-2,5-diene, bicyclo-(2.2.1)hept-2-ene, tricyclo(4.2.1.0$^{2,5}$)non-7-ene, tricyclo-(5.2.1.0$^{2,6}$)deca-3,8-diene, bicyclo(2.2.2)oct-2-ene, bicyclo(2.2.2)octa - 2,5 - diene, bicyclo(3.3.0)oct-2-ene and quadricyclo(2.2.1.2$^{2,6}$.0$^{3,5}$)non-8-ene. Particularly satisfactory results are obtained when the cyclic olefinic reactant is a monocyclic or a bicyclic olefinic reactant of up to 2 ethylenic linkages and most preferred are the monocyclic, monoolefin reactants of from 5 to 8 carbon atoms.

The molar ratio of cyclic olefinic reactant to the acyclic olefin is not critical, although it is preferred to maintain an excess of the cyclic olefinic reactant in the reaction zone. Molar ratios of cyclic olefinic reactant to acyclic olefin from about 0.5:1 to about 10:1 are satisfactory with molar ratios from about 1:1 to about 2.5:1 being preferred.

*The catalyst.*—The catalyst composition employed in the process of the invention comprises (a) a catalyst support, (b) an oxide of molybdenum or rhenium, optionally modified by the inclusion therewith of certain transition metals, and (c) an alkali metal oxide. The active catalyst composition comprises the oxide of molybdenum or rhenium which is preferably introduced in a high positive oxidation state, e.g., hexavalent molybdenum or heptavalent rhenium, and when the catalyst is provided in some other form pretreatment is customarily employed to convert the molybdenum or rhenium to the form of the oxide. The proportion of molybdenum or rhenium to be employed in the catalyst composition is varied, but amounts from about 0.5% weight to about 30% by weight, calculated as metal on the support, are satisfactory, with proportions from about 5% by weight to about 20% by weight, calculated on the same basis, being preferred.

In certain modifications of the process, it has been found desirable to include within the supported catalyst composition lesser amounts of a catalyst promoter in addition to the active catalyst material as described above. Suitable catalyst promoters are transition metals, particularly transition metals of the fourth period of the Periodic Table, e.g., cobalt, nickel, iron, chromium, vanadium, titanium and the like. The form in which the catalyst promoters are employed is preferably the oxide, although compounds which are readily converted to the oxide are suitably employed as these are converted to the oxide as during pretreatment subsequent to catalyst composition production but prior to use. The amount of catalyst promoter is not critical and as previously stated no catalyst promoter is required. When present, amounts of catalyst promoter up to about 15% by weight, calculated as the metal on the catalyst support, are satisfactory. The Group VIII transition metals of the fourth period of the Periodic Table, e.g., iron, nickel and cobalt, are particularly useful as catalyst promoters, and best results are obtained when cobalt is employed as a catalyst promoter, particularly in conjunction with molybdenum in combinations wherein the amount of cobalt present is from about 0.5% by weight to about 5% by weight, also calculated as the metal on the catalyst support.

A critical feature of the catalyst compositions of the invention is the presence therein of a minor proportion of a compound of certain alkali metals as a catalyst modifier. Although the precise role of the alkali metal compound is not known with certainty, it is evident that the alkali metal plays a substantial role in determining the selectivity of the process to specific telomer products. The preferred type of alkali metal compound to be employed is an oxide, although the alkali metal is suitably added in fact is customarily provided in some other form of chemical combination, e.g., as the hydroxide, nitrate or the like, which is readily converted to an oxide. The choice of the alkali metal of the alkali metal compound is of some importance as compounds of all alkali metals are not equally effective in modifying the activity of the catalysts. The most suitable alkali metals are alkali metals of an atomic number from 19 to 55 inclusive, i.e., potassium, rubidium or cesium, although the lighter alkali metals, lithium and sodium, are also effective. Largely for reasons of economics, the use of compounds of potassium as the catalyst modifier is preferred. Typical effective proportions of the alkali metal compound, calculated as alkali metal on the catalyst support, are from about 0.05% by weight to about 5% by weight with amounts from about 0.3% by weight to about 2.5% by weight, calculated on the same basis, being preferred.

The composition of the catalyst support employed in the supported catalysts is also of importance in obtaining suitable reaction selectivities. Broadly, suitable catalyst supports comprise at least a major proportion of alumina with no more than minor quantities of other components. The catalyst support suitably contains up to about 25% by weight based on total support of other oxide components such as silica or magnesia which are essentially inert and do not substantially promote undesirable side reactions. The support therefore comprises at least 75% by weight of alumina and preferably at least 95% by weight of alumina with any remainder being essentially inert support material.

The preparation of the supported catalysts is effected by conventional techniques of dry-mixing, coprecipitation, impregnation, ion exchange and the like and the catalyst composition components are introduced in one operation or are introduced separately in stages. In the latter modification, the order in which the various components are added to the support is not critical, although it is generally preferred to add the alkali metal compound subsequent to the addition of the other catalyst components.

In practice, the catalyst composition is subjected to a pretreatment or activation prior to utilization in the telomerization process. The precise method of pretreatment will depend in part upon the form of the chemical combination in which the components are provided, but in general the pretreatment comprises heating an initially prepared supported catalyst in an atmosphere of non-reducing gas such as nitrogen, argon, carbon monoxide or an oxygen-containing gas, e.g., air. One function served by one type of pretreatment is to convert the catalyst, catalyst promoter and catalyst modifier compounds into the form of oxides if these components were not initially provided as oxide. For example, initial catalyst composition components such as ammonium molybdate, ammonium perrhenate, cobalt nitrate, potassium hydroxide and the like are converted to corresponding oxides by heating in a non-reducing atmosphere. It is desirable that at least a major proportion of the catalyst components initially be present in the highest possible positive oxidation state and if such is not already the case, the desired elevation of positive oxidation state is effected by pretreatment in the presence of oxygen, either alone or in mixture with other gases. For example, the molybdenum of molybdenum carbonyl, initially zero-valent, is converted at least in part to the corresponding hexavalent oxide by heating in the presence of air. Regardless of the form in which the catalyst components are provided, the formed catalyst composition should be maintained for a time at an elevated temperature. The pretreatment temperature is not critical and temperatures from about 350° C. to about 750° C. are satisfactory. Typical pretreatment times are from about 3 hours to about 18 hours.

Subsequent to pretreatment, the catalyst composition is typically flushed with inert gas to remove residual traces of oxygen or adsorbed water prior to use and is returned to ambient or reaction temperature in an oxygen-free atmosphere. The finished catalyst is employed in any convenient physical form, for example, as powder, flakes, spheres or pellets.

*The reaction conditions.*—The telomerization reaction is conducted by contacting in a reaction zone the acyclic olefin reactant, the cyclic olefinic reactant and the catalyst for a period of time sufficient to allow at least about 25%, preferably at least about 30%, conversion of the cyclic olefinic reactant to reaction products. Suitable reaction temperatures vary from about 50° C. to about 200° C., although the range of from about 100° C. to about 150° C. is preferred. The pressure in the reaction zone is typically superatmospheric and pressures from about 2 atmospheres to about 100 atmospheres are satisfactory although reaction zone pressures from about 10 atmospheres to about 75 atmospheres are preferred.

The olefin contacting is conducted under conditions whereby the olefinic reactants are fluid, that is, either gaseous or liquid, and is suitably conducted as at batchwise operation as by charging the olefinic reactants and the catalyst composition to an autoclave or similar pressure reactor and maintaining the mixture at reaction temperature while agitation is applied. In an alternate modification, the reaction is conducted in a continuous manner as by passing the olefinic reactants through a tubular reactor wherein the catalyst is maintained as a fixed or as a fluidized bed. In this latter modification it is frequently useful to maintain a constant pressure of the lower boiling olefin while the other is added in increments. One convenient method of measuring the rate of olefin reactant addition is in terms of the Weight Hourly Space Velocity (WHSV) which measures the weight of olefin which contacts unit weight of catalyst composition per hour and has the units of reciprocal hours. In a particularly preferred continuous-process modification, wherein the acyclic olefin is ethylene, the cyclic olefin reactant is introduced at a WHSV of from about 0.25 to about 2.5 while a constant pressure of ethylene is maintained.

In addition to the olefinic reactants and the catalyst composition, inert materials may also be added to serve as reaction diluents, for example, gaseous diluents such as nitrogen, argon and methane, or liquid materials including saturated hydrocarbons such as cyclooctane, hexane and decahydronaphthalene. In most instances there is no advantage to be gained through the use of such a diluent and in the preferred modifications of the process no diluent is added. It is preferred, however, that the contacting be conducted in a substantially inert atmosphere, that is, in the substantial absence of reactive materials such as water, oxygen and conjugated dienes.

Subsequent to the initial contacting, the resulting product mixture contains a certain proportion of product resulting from olefin disproportionation between one molecule of acyclic olefin reactant and one molecule of cyclic olefinic reactant, that is, product of $m+n$ carbon atoms where $m$ and $n$ are as previously defined. Also present, however, is the desired telomer product of more than $m+n$ carbon atoms, more specifically, of $(m)p+n$ carbon atoms wherein $p$ is a number of at least 2, preferably from 2 to 4 inclusive, more preferably from 2 to 3 inclusive, representing the number of taxogen units in the telomer product. The telomer product is separated from disproportionation product and unconverted olefinic reactants by conventional procedures as by fractional distillation, selective extraction, selective adsorption, fractional crystallization and the like.

To more efficiently produce the desired telomer product, the product components of $m+n$ or less carbon atoms are recycled to the reaction zone wherein additional contact with added cyclic olefinic reactant results in telomer production.

*The telomer products.*—The novel telomer products of the invention are olefinic compounds having a number of carbon atoms and ethylenic linkages equal to the sum of those of one molecule of the acyclic olefin reactant and a number of molecules, e.g., 2 to 4, of the cyclic olefinic reactant. In terms of the preferred modifications of the above Formulas I and II, the telomer products are represented by the formula

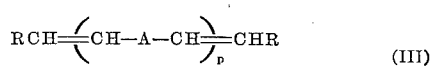
(III)

wherein A, R and $p$ have the previously stated significance. By way of specific illustration, from ethylene and cyclopentent are produced 1,6,11-dodecatriene, 1,6,11,16-heptadecatetraene and 1,6,11,16,21-docosapentaene (compounds of the above Formula III where A is trimethylene), and from reaction of ethylene and cyclooctene are produced 1,9,17-octadecatriene and 1,9,17,25-hexacosatetraene (compounds of the above Formula III wherein A is hexamethylene). Other illustrative products include 1,6,11-tridecatriene, 1,2-bis(3-vinylcyclopentyl)ethylene, 2,7,12,17-nonadecatetraene and 1,7,13-tetradecatriene. Although the telomeric products are frequently produced as a mixture of telomers differing in the value of the term "$p$" as previously defined, separation into individual telomer products is accomplished by conventional methods, e.g., fractional distillation, selective adsorption and the like.

The products are characterized by regularly occurring ethylenic linkages with three or more carbon atoms between linkages and by a symmetrical arrangement of carbon atoms and ethylenic linkages which is not observed in conventional hydrocarbon polyenes of 12 or more carbons. These products have utility as precursors of polymers, e.g., as the third component of ethylene-propylene terpolymers useful as synthetic elastomers. Cleavage of the ethylenic carbon-carbon double bonds as by ozonation followed by hydrolysis produces dicarboxylic acids which are reacted with diamines, e.g., hexamethylenediamine, to form nylons useful as synthetic fibers. The olefinic products are hydrated by conventional procedures, as by contact with sulfuric acid followed by hydrolysis of the sulfates initially formed, to polyhydric alcohols useful as precursors of alkyd resins and as precursors of polyurethane fibers formed from reaction products of the polyols and polyisocyanates such as toluene diisocyanate.

To further illustrate the improved process of the invention and the novel products thereof, the following examples are provided. It should be understood that the details thereof are not to be regarded as limitations as they may be varied as will be understood by one skilled in this art.

EXAMPLE I

A commercial cobalt molybdate-on-alumina catalyst of 8.5% wt. molybdenum and 2.1% cobalt, calculated as metal on the support, was contacted with an aqueous solution of potassium hydroxide solution for one hour to provide sufficient potassium hydroxide to ion exchange 2% wt. of potassium, calculated as metal on the support, into the catalyst composition. The catalyst composition was oven-dried at 100° C. for one hour, activated by heating at 530° C. under nitrogen for 16 hours and then brought to room temperature under oxygen-free nitrogen.

Cyclopentene was fed at a WHSV of 1 into a tubular reactor containing this catalyst and ethylene was added to maintain a total reactor pressure of 1200 p.s.i.g. as the reactor was maintained to 130° C. The conversion of cyclopentene, as determined by gas-liquid chromatographic analysis of the reactor effluent, was 35.6%. The product consisted of, in addition to 1,6-heptadiene, 1,6,11-dodecatriene (B.P. 58.8° C. at 3 mm. Hg) obtained in 18.7% selectivity and 1,6,11,16-heptadecatetraene (B.P. 86° C. at 2 mm. Hg) obtained in 5.5% selectivity.

When the unconverted ethylene and cyclopentene and the 1,6-heptadiene are recycled to the reaction zone, additional yields of 1,6,11-dodecatriene and 1,6,11,16-heptadecatetraene are obtained.

When the pressure of ethylene was reduced to 600 p.s.i.g., the conversion of cyclopentene was 26.7% over a 26-hour reaction period. Based on cyclopentene converted, the selectivity to 1,6-heptadiene was 43%, the selectivity to 1,6,11-dodecatriene was 19% and the selectivity to combined 1,6,11,16-heptadecatetraene and 1,6,11,16,21-docosapentaene was 36% with the $C_{22}$ pentaene being the almost exclusive product.

EXAMPLE II

A mixed feed consisting of 57.6% cyclopentene and 42.4% 1,6-heptadiene was introduced at a WHSV of approximately 1 into a tubular reactor containing a catalyst prepared by the procedure of Example I, which reactor was maintained at 130° C. and under an ethylene pressure of 1000 p.s.i.g. During a reaction period of 17 hours, the cyclopentene conversion was 12% and based thereon the selectivity to 1,6-heptadiene was 14%, the selectivity to 1,6,11-dodecatriene was 51% and the selectivity to 1,6,11,17-octadecatetraene was 35%.

EXAMPLE III

The procedure of Example I was employed to prepare a supported cobalt-molybdenum catalyst and utilize the catalyst in the reaction of cyclooctene and ethylene. A series of runs was made in which the reactor temperature was varied. The reactor pressure was 1200 p.s.i.g. The results of this series are given in Table I wherein the selectivity to $C_{10}$ product refers to selectivity to 1,9-decadiene and the selectivity to telomer refers to the selectivity to a mixture consisting predominantly of 1,9,17-octadecatriene and 1,9,17,25-hexacosatetraene.

TABLE I

| Temp., °C. | $C_8$ Conv., percent | Selectivity, percent wt. | |
|---|---|---|---|
| | | $C_{10}$ | Telomer |
| 100 | 25 | 79 | 21 |
| 115 | 71 | 61 | 36 |
| 115 | 52 | 64.5 | 31 |

EXAMPLE IV

The procedure of Example I was employed to prepare a supported cobalt-molybdenum catalyst and utilize the catalyst in the reaction of bicyclo(2.2.1)hept-2-ene and ethylene. A solution of 816.1 g. of the bicycloheptene in 612 g. of dodecane as diluent was introduced at a rate of 20 ml./hr. into the catalyst-containing reactor maintained at 100° C. and under a 1200 p.s.i.g. pressure of ethylene. The WHSV of the bicycloheptene was approximately 0.4 over the 49-hour reaction period. The conversion of bicycloheptene was 62% and based thereon the selectivity to 1,3-divinylcyclopentene was 45% and the selectivity to total $C_{16}$, $C_{23}$ and $C_{30}$ telomer product was 55%. The $C_{16}$ product, 1,2-bis(3-vinylcyclopentyl)ethylene, is characterized by a boiling point of 112° C. at 4 mm. Hg.

Similar results are obtained when a rhenium oxide-on-alumina catalyst is employed.

I claim as my invention:
1. The process of producing a hydrocarbon polyene product by (1) contacting in a reaction zone (a) an acyclic hydrocarbon monoolefin reactant of $n$ carbon atoms, $n$ being up to 8, and (b) a cyclic hydrocarbon olefinic reactant of up to 4 carbocyclic rings, up to 4 carbon-carbon double bonds as the only carbon-carbon unsaturation, each of which carbon-carbon double bonds is a portion of a carbocyclic ring of at least 5 carbon atoms, and up to $m$ carbon atoms, $m$ being a whole number of from 5 to 12 inclusive, in the presence of (c) a catalyst composition comprising a support of at least 75% by weight of alumina and any remainder being inert support material, from about 0.5% by weight to about 30% by weight, calculated as metal on the support, of a metal oxide catalyst, said metal being molybdenum or rhenium, and from about 0.05% by weight to about 5% by weight, calculated as metal on the support, of an alkali metal oxide catalyst modifier, said contacting being conducted at a temperature from about 50° C. to about 200° C. and a pressure from about 2 atmospheres to about 100 atmospheres to a conversion of said acyclic olefinic reactant of at least about 30%, (2) separating from the resulting mixture unconverted reactants and product of $m+n$ or less carbon atoms to afford said hydrocarbon polyene product of more than $m+n$ carbon atoms, and (3) recycling said unconverted reactants and product of $m+n$ or less carbon atoms to said reaction zone.

2. The process of claim 1 wherein the cyclic olefinic reactant is of up to 2 carbocyclic rings and of up to 2 carbon-carbon double bonds, and $n$ is up to 4.

3. The process of claim 2 wherein the metal oxide catalyst is rhenium oxide.

4. The process of claim 2 wherein the metal oxide is molybdenum oxide.

5. The process of claim 4 wherein the catalyst composition additionally contains up to about 15% by weight, calculated as metal on the support, of a transition metal oxide catalyst modifier, said transition metal being of the fourth period of the Periodic Table.

6. The process of claim 5 wherein said transition metal is cobalt.

7. The process of claim 6 wherein the acyclic monoolefin reactant is ethylene and the cyclic olefinic reactant is a monocyclic, monoolefin reactant of from 5 to 8 carbon atoms.

8. The process of claim 7 wherein the cyclic olefinic reactant is cyclopentene.

9. The process of claim 7 wherein the cyclic olefinic reactant is cyclooctene.

10. The compound 1,9,17-octadecatriene.

11. The compound 1,9,17,25-hexacosatetraene.

References Cited

UNITED STATES PATENTS

| 3,424,811 | 1/1969 | Mango | 260—680 |
| 3,379,781 | 4/1968 | Zuech et al. | 260—666 |
| 3,219,716 | 11/1965 | Wittenberg et al. | 260—666 |
| 3,391,212 | 7/1968 | Napolitano et al. | 260—677 |

FOREIGN PATENTS

| 6,702,703 | 8/1967 | Netherlands. |
| 1,043,143 | 9/1966 | Great Britain. |

OTHER REFERENCES

Heilbron, "Dictionary of Organic Compounds," II Hystazarin, 1953, New York, p. 637.

DELBERT E. GANTZ, Primary Examiner

J. M. NELSON, Assistant Examiner

U.S. Cl. X.R.

260—680